US011557892B2

(12) United States Patent
Loy-Lafond

(10) Patent No.: US 11,557,892 B2
(45) Date of Patent: Jan. 17, 2023

(54) ELECTRICAL SYSTEM WITH CURRENT-CONSUMING CIRCUIT FOR DISCHARGING A CAPACITOR ASSOCIATED MOTOR VEHICLE AND METHOD

(71) Applicant: Valeo Equipements Electriques Moteur, Creteil (FR)

(72) Inventor: Philippe Loy-Lafond, Cergy Pontoise (FR)

(73) Assignee: Valeo Equipements Electriques Moteur, Creteil (FR)

( * ) Notice: Subject to any disclaimer, the term of this patent is extended or adjusted under 35 U.S.C. 154(b) by 553 days.

(21) Appl. No.: 16/492,243

(22) PCT Filed: Mar. 8, 2018

(86) PCT No.: PCT/FR2018/050543
§ 371 (c)(1),
(2) Date: Dec. 17, 2019

(87) PCT Pub. No.: WO2018/162859
PCT Pub. Date: Sep. 13, 2018

(65) Prior Publication Data
US 2020/0244093 A1 Jul. 30, 2020

(30) Foreign Application Priority Data
Mar. 8, 2017 (FR) ...................................... 1751862

(51) Int. Cl.
*B60L 3/00* (2019.01)
*H02H 7/12* (2006.01)
(Continued)

(52) U.S. Cl.
CPC ............. *H02H 3/14* (2013.01); *B60L 3/0046* (2013.01); *H02H 7/1213* (2013.01);
(Continued)

(58) Field of Classification Search
CPC ...... H02H 3/14; H02H 7/1213; H02H 7/1222; H02H 7/18; B60L 3/0046; H02J 7/345; H02M 1/322
See application file for complete search history.

(56) References Cited

U.S. PATENT DOCUMENTS

| 6,204,612 | B1 | 3/2001 | Liu | |
| 9,018,865 | B2 * | 4/2015 | Meyer, III | ............ H01M 10/44 320/135 |
| 9,231,414 | B2 * | 1/2016 | Viancino | ............... H03K 17/163 |

FOREIGN PATENT DOCUMENTS

| CN | 102983600 A | 3/2013 |
| CN | 103373296 A | 10/2013 |

(Continued)

OTHER PUBLICATIONS

First Office Action in corresponding Chinese Application No. 201880030270.3, dated May 7, 2021 (14 pages).
(Continued)

*Primary Examiner* — Stacy Whitmore
(74) *Attorney, Agent, or Firm* — Osha Bergman Watanabe & Burton LLP

(57) ABSTRACT

The electrical system (100) includes: —a capacitor (C); —an electrical power supply device (102); —an electrical power receiving device (104); —a current-consuming electrical circuit (108) designed to consume a current (i) entering via a first interface terminal ($B_A$) and exiting via a second interface terminal ($B_B$). The electrical system (100) being designed such that the current-consuming electrical circuit (108) consumes the discharge current (i) when the electrical power supply device (102) is connected to the terminals of the capacitor (C).
The current-consuming electrical circuit (108) includes a transistor (Q1) arranged such that the consumed current (i) enters via a current input terminal (C1) of the transistor (Q1) and exits via a current output terminal (E1) of the transistor (Q1), and in that the current output terminal (E1) is connected to a control terminal (B1) of the transistor (Q1) in order to stabilize the transistor (Q1).

12 Claims, 3 Drawing Sheets

(51) Int. Cl.
*H02H 7/122* (2006.01)
*H02H 7/18* (2006.01)
*H02J 7/34* (2006.01)
*H02H 3/14* (2006.01)
*H02J 7/00* (2006.01)

(52) U.S. Cl.
CPC ............ *H02H 7/1222* (2013.01); *H02H 7/18* (2013.01); *H02J 7/0029* (2013.01); *H02J 7/345* (2013.01)

(56) References Cited

FOREIGN PATENT DOCUMENTS

| EP | 2093872 A1 | 8/2009 |
|----|------------|--------|
| EP | 2556980 A2 | 2/2013 |

OTHER PUBLICATIONS

International Search Report and Written Opinion issued in corresponding PCT Application No. PCT/FR2018/050543, dated Jul. 4, 2018 (10 Pages with English Translation of International Search Report).

* cited by examiner

US 11,557,892 B2

ELECTRICAL SYSTEM WITH CURRENT-CONSUMING CIRCUIT FOR DISCHARGING A CAPACITOR ASSOCIATED MOTOR VEHICLE AND METHOD

TECHNICAL FIELD

The present invention relates to the discharging of a capacitor, in particular in the field of electric motor vehicles.

TECHNOLOGICAL BACKGROUND

The US patent published under the number U.S. Pat. No. 6,204,612 B1 describes a capacitor, to the terminals of which an electrical power module is intended to be connected. It additionally describes a current-consuming electrical circuit including a stabilized transistor, which is connected to the terminals of the capacitor. In this publication, the current-consuming electrical circuit is designed so as to be activated in order to consume a substantially constant discharge current when the power module is mechanically and electrically disconnected from the capacitor. Thus, the consumption of current discharges the capacitor so as to prevent electric shocks that could occur if an operator were to touch the capacitor. More specifically, the power module includes a conductor arranged so as to short a controlled switch in order to deactivate the current-consuming circuit. Thus, when the power module is disconnected, the conductor is disconnected from the controlled switch, causing the current-consuming electrical circuit to be activated. This solution has the drawback of requiring the presence of a mechanical element (the conductor) on the power-module side. Moreover, this solution does not allow the capacitor to be discharged while the power module is still mechanically in place but electrically disconnected from the capacitor, for example in the event of an electrical connection fault.

Additionally, it is known practice to connect a resistor to the terminals of a capacitor that is supplied with power by a high-voltage source in order to discharge the capacitor in the event that the high-voltage source is disconnected. This solution has the drawback that the resistor continuously consumes substantial current, even when this is not desired, that is to say when the high-voltage source is connected to the capacitor.

The aim of the invention is to at least partly overcome the abovementioned problems.

SUMMARY OF THE INVENTION

To this end, what is proposed is an electrical system including:
- a capacitor having two terminals;
- an electrical power supply device connected to the terminals of the capacitor;
- an electrical power receiving device connected to the terminals of the capacitor so as to receive the electrical power supplied by the electrical power supply device;
- a current-consuming electrical circuit having two interface terminals that are connected, respectively, to the terminals of the capacitor and being designed to consume a current entering via a first interface terminal and exiting via a second interface terminal, the electrical system being designed such that the current-consuming electrical circuit consumes the current when the electrical power supply device is connected to the terminals of the capacitor, the electrical system being characterized in that the current-consuming electrical circuit includes a transistor arranged such that the consumed current enters via a current input terminal of the transistor and exits via a current output terminal of the transistor, and in that the current output terminal is connected to a control terminal of the transistor in order to stabilize the transistor.

Optionally, the current-consuming electrical circuit includes a Zener diode connected between the current output terminal of the transistor and the control terminal of the transistor in order to stabilize the transistor.

Also optionally, the current-consuming electrical circuit includes a resistor connected between the control terminal of the transistor and the first interface terminal.

Also optionally, the current-consuming electrical circuit includes a resistor connected between the current input terminal of the transistor and the first interface terminal.

Also optionally, the current-consuming electrical circuit includes a resistor connected between the current output terminal and the second interface terminal.

Also optionally, the electrical power supply device is designed to apply a DC supply voltage.

Also optionally, the DC supply voltage is higher than 60 V, preferably higher than 300 V.

Also optionally, the electrical power supply device includes one of the following: a battery charger and a battery.

Also optionally, the electrical power receiving device includes one of the following: a battery, an inverter and a DC-to-DC converter.

An electrical system according to the invention is also proposed.

Throughout the preceding text, the current-consuming electrical circuit may be a passive circuit. This current-consuming electrical circuit may be supplied with electrical power exclusively via the two interface terminals, in particular by the capacitor that is to be discharged when the electrical power supply device is not operational. This electrical discharge circuit may moreover be devoid of any computing component, that is to say any component designed to run a computer program, such as a microcontroller or a microprocessor.

Also proposed is a method for discharging a capacitor having two terminals, including:
- when an electrical power supply device is connected to the terminals of the capacitor in order to apply a supply voltage across the terminals of the capacitor, a current-consuming electrical circuit having two interface terminals that are connected, respectively, to the terminals of the capacitor consumes a current entering via a first interface terminal and exiting via a second interface terminal;
- when the electrical power supply device is no longer in operation so as no longer to restrict a capacitor voltage present across the terminals of the capacitor, the current-consuming electrical circuit consumes the current in order to discharge the capacitor, the method being characterized in that the current-consuming electrical circuit used in preceding steps includes a transistor arranged such that the consumed current enters via a current input terminal of the transistor and exits via a current output terminal of the transistor, and in that the current output terminal of the transistor is connected to a control terminal of the transistor in order to stabilize the transistor.

In one particular embodiment of the invention, the current-consuming electrical circuit used in the above-described steps of the discharge method further includes a Zener diode connected between the current output terminal of the transistor and the control terminal of the transistor in order to stabilize the transistor.

In another particular embodiment of the invention, the current-consuming electrical circuit used in the above-described steps of the discharge method further includes a resistor connected between the current input terminal of the transistor and the first interface terminal.

DETAILED DESCRIPTION

Figure 1:
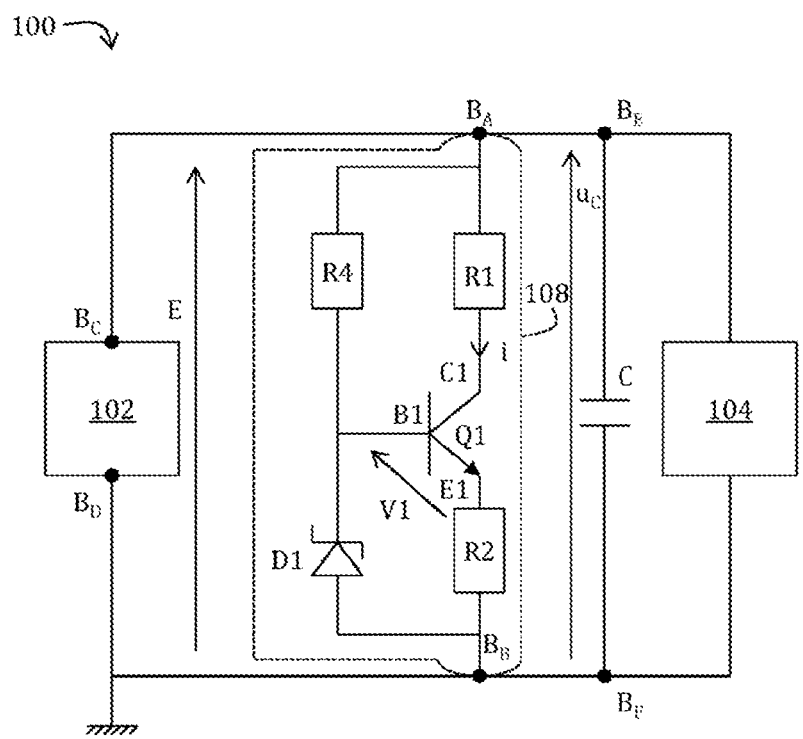
FIG. 1 is a circuit diagram of an electrical system according to the invention including a current-consuming electrical circuit for discharging a capacitor.

An electrical system 100 implementing the invention will now be described with reference to FIG. 1.

The electrical system 100 firstly includes an electrical power supply device 102 that is provided with two electrical power supply terminals $B_C$, $B_D$ across which a supply voltage E is designed to be supplied. For example, the supply voltage E is substantially constant. Furthermore, in the example described, the power supply terminal $B_D$ is connected to an electrical ground of the electrical system 100, and the power supply terminal $B_C$ is intended to be at the positive potential of +E V.

The electrical system 100 furthermore includes an electrical power receiving device 104 connected between the electrical power supply terminals $B_C$, $B_D$ and designed to receive electrical power supplied by the electrical power supply device 102.

The electrical system 100 furthermore includes a capacitor C having two terminals $B_E$, $B_F$ that are connected, respectively, to the electrical power supply terminals $B_C$, $B_D$ and being designed for example to smooth the supply voltage E. Across its terminals $B_E$, $B_F$, the capacitor C has a capacitor voltage $u_C$ which is equal to the supply voltage E when the electrical power supply device 102 is operational.

The electrical system 100 furthermore includes a current-consuming electrical circuit 108 having two interface terminals $B_A$, $B_B$ that are connected, respectively, to the terminals $B_E$, $B_F$ of the capacitor C so as to receive the capacitor voltage $u_C$. The current-consuming electrical circuit 108 is designed to consume a current i entering via the first interface terminal $B_A$ and exiting via the second interface terminal $B_B$.

The current-consuming electrical circuit 108 is intended in particular to discharge the capacitor C when the electrical power supply device 102 is not operational, for example when it is disconnected. This situation occurs for example, in FIG. 1, when one of the connections connecting the electrical power supply terminals $B_C$, $B_D$ to the interface terminals $B_A$, $B_B$ is broken.

The current-consuming electrical circuit 108 includes a transistor Q1 which has a current input terminal C1, a current output terminal E1 and a control terminal B1. In the example described, the transistor Q1 is a bipolar transistor which has a collector, an emitter and a base corresponding to the current input terminal C1, the current output terminal E1 and the control terminal B1, respectively. The open or closed state of the transistor Q1 is defined by a control voltage V1 that is present between the control terminal B1 and the current output terminal E1. Additionally, the current i flows through the transistor Q1 by entering via the current input terminal C1 and exiting via the current output terminal E1.

In the example described, the current-consuming electrical circuit 108 furthermore includes a resistor R1 connected between the current input terminal C1 and the interface terminal $B_A$.

In the example described, the current-consuming electrical circuit 108 furthermore includes a resistor R2 connected between the current output terminal E1 and the interface terminal $B_B$.

In the example described, the current-consuming electrical circuit 108 furthermore includes a resistor R4 connected between the control terminal B1 and the interface terminal $B_A$.

In the example described, the current-consuming electrical circuit 108 furthermore includes a Zener diode D1 connected between the control terminal B1 and the interface terminal $B_B$.

Thus, the current output terminal E1 of the transistor Q1 is connected to the control terminal B1 of the transistor Q1 through the resistor R2 and the Zener diode D1 in order to stabilize the transistor Q1.

The operation of the electrical system 100 will now be described with reference to FIG. 2.

Initially, the electrical power supply device 102 is operational and supplies the supply voltage E, which has the value of 500 V in the example described. Generally, the supply voltage E is a "high voltage", which means, in the automotive field, that it has a value greater than 60 V, preferably greater than 300 V.

Thus, the capacitor C is charged at the supply voltage E such that the capacitor voltage $u_C$ is equal to the supply voltage E.

The control terminal B1 of the transistor Q1 is charged through the resistor R4 such that the transistor Q1 is in the closed (on) state. Thus, a non-zero current i flows from the interface terminal $B_A$ to the interface terminal $B_B$ through the transistor Q1. Since the transistor Q1 is stabilized, the current i is substantially constant, even in the case of a fluctuation in the supply voltage E, and has a value of 5 mA in the example illustrated. In general, the current i preferably has a value of more than 1 mA.

At a time $t_0$, the electrical power supply device 102 transitions to the non-operational state, for example by being disconnected from the rest of the electrical system 100.

Thus, the consumption of the current i results in the capacitor C being discharged and hence the capacitor voltage $u_C$ dropping. Since the transistor Q1 is stabilized, the current i flowing through it is substantially constant (slightly decreasing, in fact), at a distinctly higher level than would be the case if it were discharged into a simple resistor. Specifically, in this latter case, the current would decrease exponentially and hence very quickly in the first moments following the disconnection of the electrical power supply device 102. Thus, since the current i consumed remains at a high level, close to the level before time to, the capacitor voltage $u_C$ drops rapidly.

Figure 2:
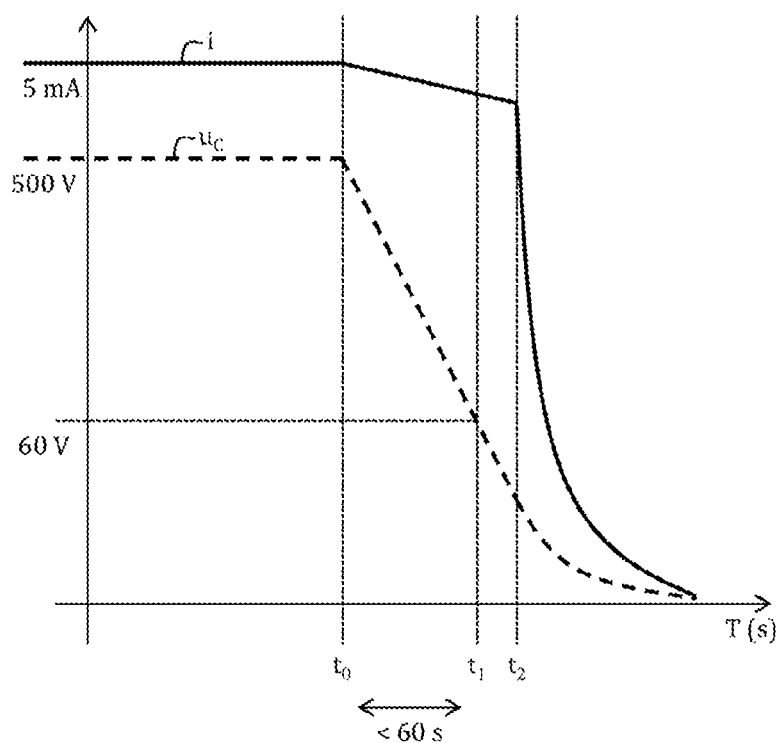
FIG. 2 is a timing diagram illustrating the change with time in a capacitor voltage and in a current entering the current-consuming electrical circuit.

Preferably, the components are chosen such that the capacitor C is discharged to less than 60 V in less than 60 seconds (time $t_1$ in FIG. 2).

By virtue of the transistor Q1 being stabilized, it is possible to size the current-consuming electrical circuit 108 such that the starting current i (i.e. before $t_0$, when the electrical power supply device 102 is operational) is small, in any case smaller than when using a discharge resistor. Thus, in the electrical system 100, the losses arising from the consumption of the current i while the electrical power supply device 102 is operational are lower than when a resistor is used.

Furthermore, at a time $t_2$, when the capacitor voltage $u_C$ becomes too low to keep the transistor Q1 stabilized, the current-consuming device 108 "collapses", i.e. it is no longer capable of keeping the current i substantially constant and this current decreases very rapidly. This collapse is of no consequence since the desired discharging of the capacitor ($u_C$<60 V) has already been achieved.

Furthermore, in accordance with the foregoing, it will be understood that the current-consuming electrical circuit 108 is a passive circuit, which means both that it is designed to be supplied with electrical power exclusively via the two interface terminals $B_A$, $B_B$, in particular by the capacitor C when the electrical power supply device 102 is not operational and that it does not include any computing component, that is to say any component designed to run a computer program, such as a microcontroller or a microprocessor.

Figure 3:
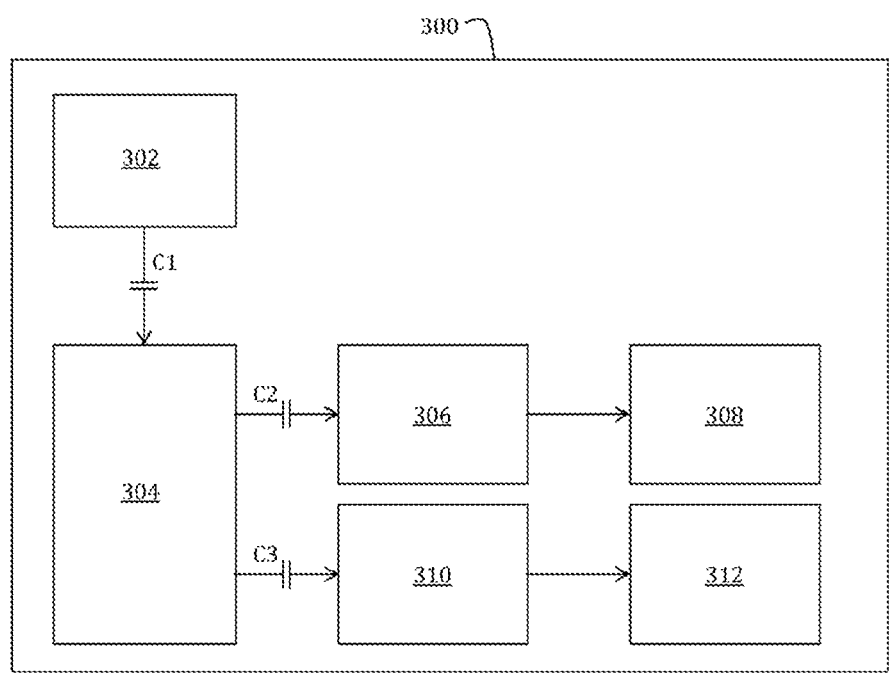
FIG. 3 is a diagram illustrating a motor vehicle including at least one electrical system such as illustrated in FIG. 1.

An electric motor vehicle 300 will now be described with reference to FIG. 3.

The electric motor vehicle 300 includes a charger 302 designed to be connected to an electrical network and to provide a DC voltage.

The electric motor vehicle 300 furthermore includes a high-voltage battery 304 designed to be charged by the charger 302.

The electric motor vehicle 300 furthermore includes a capacitor C1 inserted between the charger 302 and the high-voltage battery 304.

The electric motor vehicle 300 furthermore includes an inverter 306 designed to supply AC voltages on the basis of the DC voltage from the high-voltage battery 304.

The electric motor vehicle 300 furthermore includes a capacitor C2 inserted between the high-voltage battery 304 and the inverter 306.

The electric motor vehicle 300 furthermore includes an electric motor 308 designed to be supplied with electrical power by the inverter 306 and to drive wheels of the electric motor vehicle 300.

The electric motor vehicle 300 furthermore includes a DC-to-DC converter 310 designed to supply a low voltage on the basis of the high voltage supplied by the high-voltage battery 304.

The electric motor vehicle 300 furthermore includes a capacitor C3 inserted between the high-voltage battery 304 and the DC-to-DC converter 310.

The electric motor vehicle 300 furthermore includes a low-voltage battery 312 designed to be charged by the DC-to-DC converter 310. The low-voltage battery 312 serves for example to supply electrical power to accessories of the electric motor vehicle 300.

The current-consuming electrical circuit 108 described with reference to FIG. 1 may be used for each of the capacitors C1, C2, C3. Thus, depending on the capacitor concerned, the electrical power supply device 102 thus includes one of the following: the charger 302 and the high-voltage battery 304, and the electrical power receiving device includes one of the following: the high-voltage battery 304, the inverter 306 and the DC-to-DC converter 310.

The present invention is not limited to the embodiment described above, but rather is defined by the claims below. Indeed, it will be obvious to a person skilled in the art that it can be modified.

For example, one or other of the resistors R1 and R2 could be omitted.

Additionally, the Zener diode D1 could be replaced with a resistor.

Moreover, each of one or more resistors R1, R2 and R4 is preferably a resistor having a resistance that varies little with temperature, for example varying at most by 100 millionths of an ohm per degree Celsius between 0° C. and 150° C.

Moreover, the terms used in the claims should not be understood as being limited to the elements of the embodiment described above, but rather should be understood as covering all equivalent elements that a person skilled in the art is able to infer from his or her general knowledge.

In particular, the term "electric motor vehicle" also covers the case of hybrid motor vehicles including both an electric motor and a combustion engine for driving the wheels.

The invention claimed is:

1. An electrical system comprising:
a capacitor having two terminals;
an electrical power supply device connected to the terminals of the capacitor;
an electrical power receiving device connected to the terminals of the capacitor to receive the electrical power supplied by the electrical power supply device;
a current-consuming electrical circuit having two interface terminals that are connected, respectively, to the terminals of the capacitor and being configured to consume a current entering via a first interface terminal and exiting via a second interface terminal,
wherein the current-consuming electrical circuit consumes the current when the electrical power supply device is connected to the terminals of the capacitor, and
wherein the current-consuming electrical circuit includes a transistor arranged such that the consumed current enters via a current input terminal of the transistor and exits via a current output terminal of the transistor, and wherein the current output terminal is connected to a control terminal of the transistor in order to stabilize the transistor.

2. The electrical system as claimed in claim 1, wherein the current-consuming electrical circuit includes a Zener diode connected between the current output terminal of the transistor and the control terminal of the transistor in order to stabilize the transistor.

3. The electrical system as claimed in claim 1, wherein the current-consuming electrical circuit includes a resistor connected between the control terminal of the transistor and the first interface terminal.

4. The electrical system as claimed in claim 1, wherein the current-consuming electrical circuit includes a resistor connected between the current input terminal of the transistor and the first interface terminal.

5. The electrical system as claimed in claim 1, wherein the current-consuming electrical circuit includes a resistor connected between the current output terminal and the second interface terminal.

6. The electrical system as claimed in claim 1, wherein the electrical power supply device applies a DC supply voltage.

7. The electrical system as claimed in claim 6, wherein the DC supply voltage is higher than 300 V.

8. The electrical system as claimed in claim 1, wherein the electrical power supply device includes one selected from the group consisting of: a battery charger and a battery.

9. The electrical system as claimed in claim 1, wherein the electrical power receiving device includes one selected from the group consisting of: a battery, an inverter and a DC-to-DC converter.

10. The electrical system as claimed in claim 1, wherein the current-consuming electrical circuit is a passive circuit.

11. A motor vehicle including an electrical system as claimed in claim 1.

12. A method for discharging a capacitor having two terminals, comprising:
when an electrical power supply device is connected to the terminals of the capacitor to apply a supply voltage across the terminals of the capacitor, a current-consuming electrical circuit having two interface terminals that are connected, respectively, to the terminals of the capacitor consumes a current entering via a first interface terminal and exiting via a second interface terminal; and
when the electrical power supply device is no longer in operation so as no longer to restrict a capacitor voltage ($u_C$) present across the terminals of the capacitor, the current-consuming electrical circuit consumes the current to discharge the capacitor,
wherein the current-consuming electrical circuit includes a transistor arranged such that the consumed current enters via a current input terminal of the transistor and exits via a current output terminal of the transistor, and
wherein the current output terminal of the transistor is connected to a control terminal of the transistor to stabilize the transistor.

* * * * *